Figure 1:
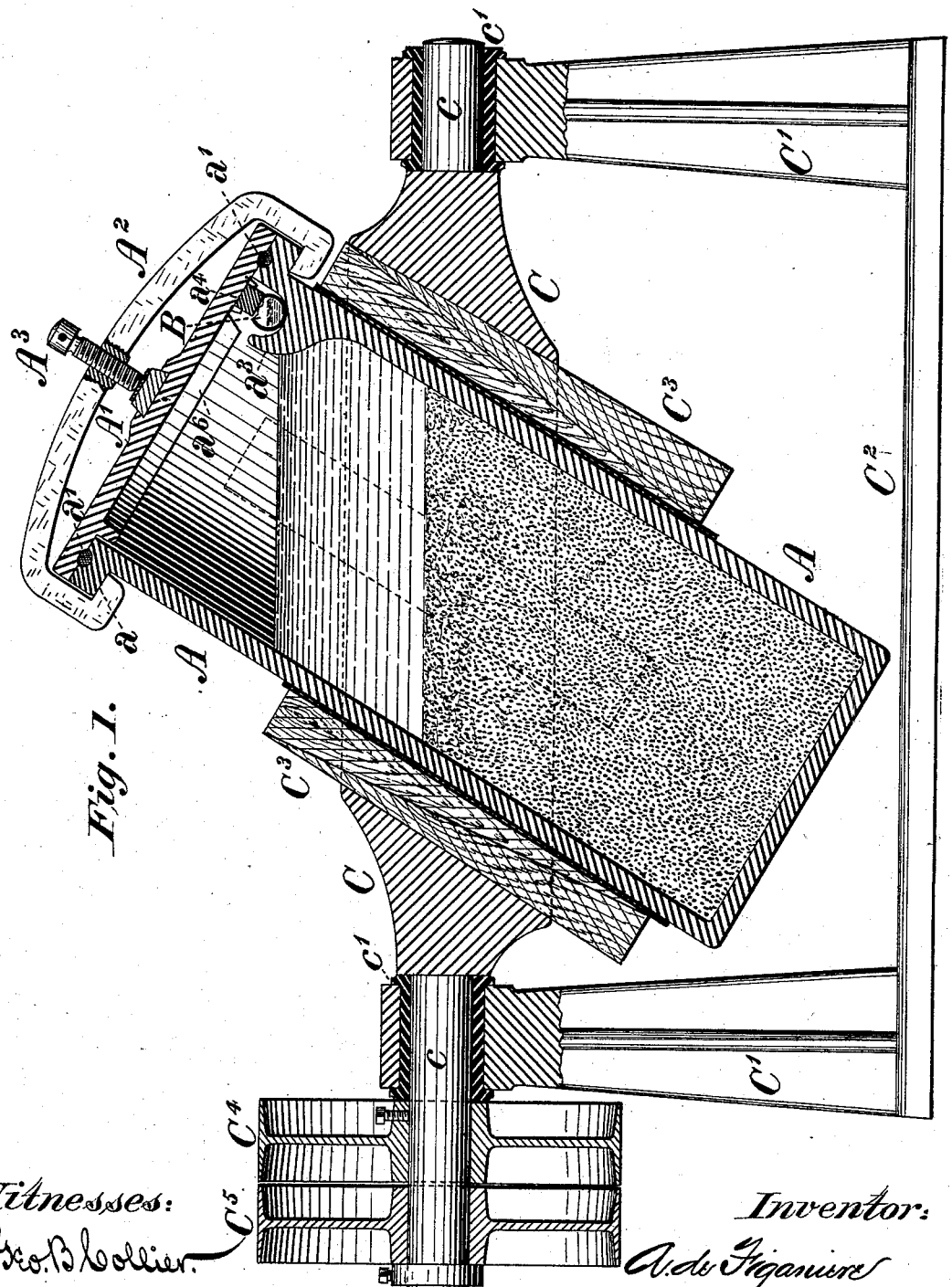

(No Model.)

A. DE FIGANIERE.
PROCESS OF AND APPARATUS FOR EXTRACTING GOLD FROM ITS ORES.

No. 267,842. Patented Nov. 21, 1882.

Witnesses:
Geo. B. Collier.
Geo. T. Kelly.

Inventor:
A. de Figaniere
by Collier & Bell,
Attys.

(No Model.) 2 Sheets—Sheet 2.

A. DE FIGANIERE.
PROCESS OF AND APPARATUS FOR EXTRACTING GOLD FROM ITS ORES.

No. 267,842. Patented Nov. 21, 1882.

Witnesses:
Geo. B. Collier
Geo. F. Kelly

Inventor:
A. de Figaniere,
by Collier & Bell,
attys.

N. PETERS, Photo-Lithographer, Washington, D. C.

UNITED STATES PATENT OFFICE.

AFFONSO DE FIGANIERE, OF PHILADELPHIA, PENNSYLVANIA.

PROCESS OF AND APPARATUS FOR EXTRACTING GOLD FROM ITS ORES.

SPECIFICATION forming part of Letters Patent No. 267,842, dated November 21, 1882.

Application filed February 9, 1881. (No model.)

*To all whom it may concern:*

Be it known that I, AFFONSO DE FIGANIERE, of the city and county of Philadelphia, in the State of Pennsylvania, have invented certain new and useful Improvements in the Treatment of Ores, of which improvements the following is a specification.

The object of my invention is to effect in a thorough and economical manner the extraction of gold from its ores; to which end my improvements consist in a process of and apparatus for the extraction of gold from its ores by the action of bromine, as hereinafter more fully set forth.

In the practice of my invention the ore, having been previously ground or pulverized, is placed in a vessel of sufficient strength, possessing the capacity of resisting the action of bromine, and having a lid or stopper that can be made perfectly air-tight, the volume of the charge being about one-half that of the vessel, and water is supplied to the vessel in quantity sufficient to occupy the major portion of the remainder of its volume. A tightly-stoppered bottle containing a charge of bromine corresponding in weight to about four times that of the gold in the ore to be treated is placed in a dish or receptacle located within the ore-vessel in such position as to admit of the breaking of the bottle coincidently with or subsequently to the closing of the mouth of the vessel. The lid or stopper having been applied and an air-tight joint made by suitable packing, the bottle is broken, and the bromine, being liberated, flows out and becomes partially volatilized, the fumes being readily absorbed by the water in the vessel, while the remaining liquid bromine is permitted to drop into and subsequently becomes dissolved by the water. The vessel is slowly agitated, so as to cause the grains of ore to continually change their positions, their resultant abrasion and mixture with the liquid effecting a rapid solution of the bromine, and facilitating and accelerating the action of the bromine upon the ore. At the expiration of from one to two hours all the gold present in the ore will have been converted into bromide of gold, $(AuBr_3,)$ when the contents of the vessel are removed and subjected to lixiviation to separate the solution of bromide of gold from the ore. The solution next is percolated through sawdust or other form of woody fiber or cellulose wherein a surface action can occur, the result of which action is a precipitation of metallic gold within the interstices of said material, whence it is recovered by burning away the material, the ash of which being mixed with a proper flux in a crucible and subjected to the action of heat the gold will be found in a single mass or button at the bottom of the crucible. Where auriferous pyrites are to be treated the ore must have previously received a "dead roast," in order that the metals present capable of such combination shall have been perfectly oxidized and their sulphides thoroughly decomposed, inasmuch as bromine combines with the metals for which it has affinity only when the same are unoxidized, and will therefore be inactive upon those that have been oxidized in and by the roasting, and act only upon the gold contained in the charge.

Figure 2:
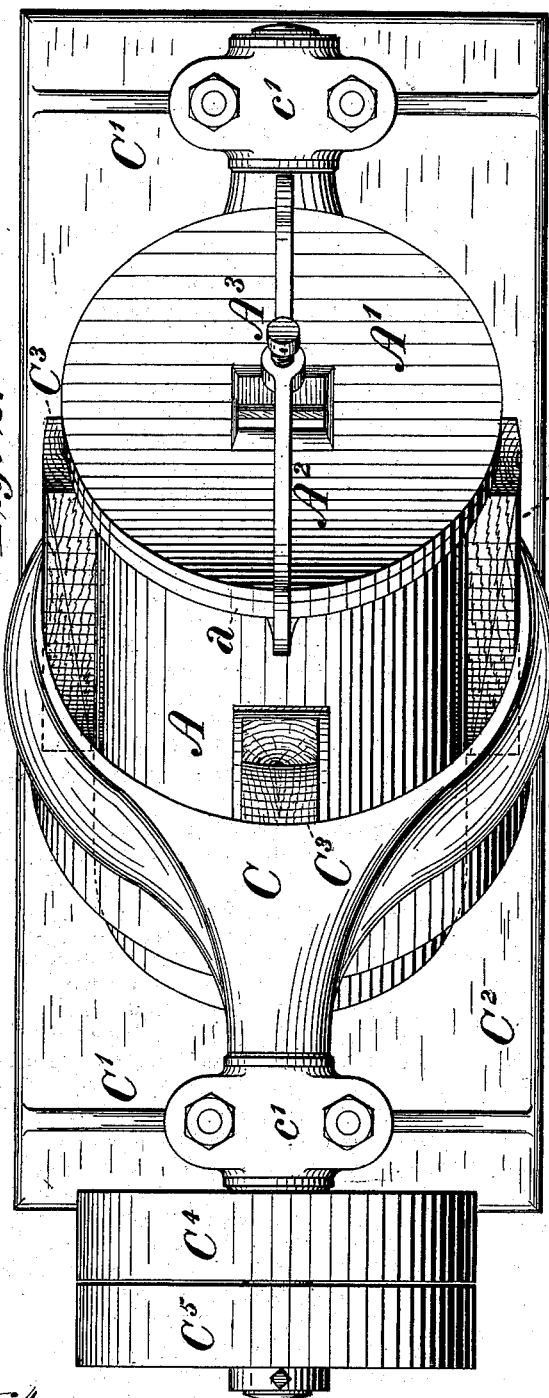
Figure 3:
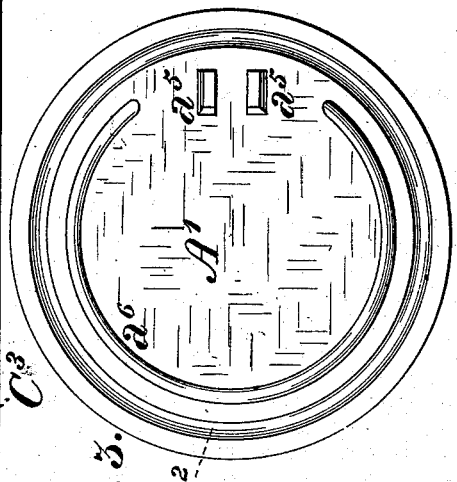
Figure 4:
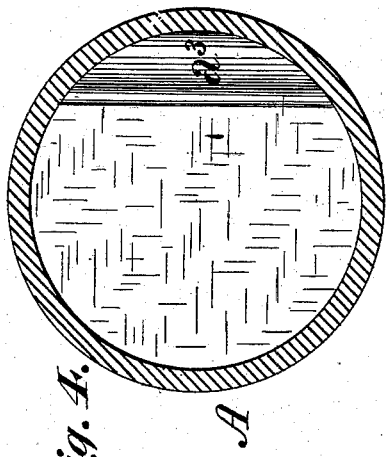

In the accompanying drawings, Figure 1 is vertical longitudinal central section through an apparatus for treating ores with bromine, as hereinbefore described; Fig. 2, a plan or top view of the same; Fig. 3, a plan view of the cover of the ore-vessel as seen from the lower side; and Fig. 4, a horizontal section through the ore-vessel, adjacent to its top.

The ore-vessel A is cylindrical in form, having a wide open top encircled by a flange or rim, $a$, and is by preference composed of "chemical ware," such material possessing the advantages of being durable, inexpensive, of sufficient strength, and impervious to the action of bromine. An annular groove extends around the top of the vessel for the reception of a packing-ring, $a'$, of dough or other suitable material, the lid $A'$ of the vessel being provided with a corresponding groove, $a^2$. A dish or receptacle, $a^3$, is formed on the inner side of the vessel A, adjacent to its top, to receive a bromine-bottle, B, which is broken by means of a crusher, $a^4$, in this instance consisting of a leaden wedge fitted so as to be readily insertible and removable between jaws $a^5$, projecting from the inner side of the lid $A'$. The depth of the crusher $a^4$ is such as that when the lid is placed on the vessel and pressed down tightly upon the packing-ring by the clamp $A^2$ and screw $A^3$ the crusher will bear upon and fracture the bottle B, this operation not being effected until after the joint of the vessel and its lid has been sealed by the contact of the lid with the top of the packing-ring $a'$, as it occurs while the packing-ring is being compressed in screwing the lid to a tight bearing. The size of the bromine-bottle varying with different charges, the provision of a removable crusher enables a proper adjustment to be made for the breakage of different-sized bottles, a deeper or a shallower wedge being inserted in the jaws $a^5$, as the diameter of the bottle employed may require. An inner rim, $a^6$, on the lid insures the accurate correspondence of the groove $a^2$ with the packing-ring in making the joint. The vessel A is supported in an inclined position—say at an angle of thirty degrees—within a yoke, C, having journals $c$ on its ends, mounted in bearings $c'$ in vertical standards $C'$, formed upon or secured to a bed plate or frame, $C^2$. Wedges $C^3$ are fitted in pairs between the periphery of the vessel A and the yoke, and by proper adjustment hold the vessel securely in position, with the capacity of ready removal when required. Fast and loose pulleys $C^4$ $C^5$, upon one of the journals $c$ of the yoke C, admit of the rotation of the yoke and ore-vessel at a slow speed, with the proper intervals of rest for charging and emptying the vessel.

In operation, the ore-vessel being fitted and secured in the yoke by the wedges, a charge of pulverized ore and water is introduced and a bottle containing the proper quantity of bromine placed in the dish. The bromine-bottle is then broken by the tightening of the lid upon the packing-ring, as hereinbefore described, and the vessel is slowly rotated by the application of power to the fast pulley $C^4$. The compound movement of rotation imparted to the ore-vessel by reason of its inclined position effects a perfect solution of the bromine, an intimate mixture of the solution with the particles of ore, and a constant abrasion of the particles one upon the other, due to their continual changes of position. At the expiration of the operation the contents of the vessel are removed, leached with water, and the separated solution of bromide of gold percolated through sawdust or other combustible material in such condition of subdivision as to present as large an amount of surface as practicable to the solution in its traverse, during which the gold is deposited upon the material, from which it is recovered by burning the latter and heating the ashes in a crucible. The leaching and percolating apparatus may be of any approved construction known in the arts, the special features of which, not being essential to the practice of my present invention, need not be herein specifically described.

I am aware that the property of bromine as a solvent for gold is well known in chemistry, and that its employment in lieu of chlorine has been heretofore suggested and recommended in the extraction of gold from its ores. I do not therefore broadly claim the use of this element for such purpose, but, on the contrary, confine myself to the specific mode of effecting its practical application, hereinabove set forth.

I claim as my invention and desire to secure by Letters Patent—

1. The improvement in the art of treating ores, which consists in the formation of bromide of gold by the agitation of pulverized auriferous material and bromine in a closed vessel, the separation of the bromide of gold by the leaching of the charge, the decomposition of the bromide of gold by percolation through woody fiber in a state of subdivision, and the final recovery of the gold by the combustion of the woody fiber, the several operations constituting the successive steps of a continuous process, substantially as set forth.

2. In an apparatus for the treatment of ores, the combination of an ore-vessel, a lid or cover, and a yoke suited to receive the ore-vessel, and having journals at an angle to its axial line, through which a compound movement of rotation may be imparted to the ore-vessel, substantially as set forth.

3. In an apparatus for the treatment of ores, the combination, substantially as set forth, of an ore-vessel having a flanged top and an annular recess therein adapted to receive a packing-ring, an internal disk or receptacle, a lid or cover having jaws or projections on its lower side, a crusher fitting therein, and a clamping device, by which the lid is pressed against the packing-ring and the crusher moved toward the internal receptacle.

A. DE FIGANIERE.

Witnesses:
J. SNOWDEN BELL,
GEO. B. COLLIER.